(12) United States Patent
Tamura

(10) Patent No.: US 9,489,978 B2
(45) Date of Patent: Nov. 8, 2016

(54) METHOD OF SURFACE-TREATING METAL COMPONENT

(75) Inventor: Tatsuji Tamura, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 14/119,644

(22) PCT Filed: Jun. 1, 2012

(86) PCT No.: PCT/JP2012/003630
§ 371 (c)(1),
(2), (4) Date: Nov. 22, 2013

(87) PCT Pub. No.: WO2012/169163
PCT Pub. Date: Dec. 13, 2012

(65) Prior Publication Data
US 2014/0150931 A1    Jun. 5, 2014

(30) Foreign Application Priority Data
Jun. 6, 2011    (JP) .................................. 2011-126772

(51) Int. Cl.
| | |
|---|---|
| *G11B 23/00* | (2006.01) |
| *C23F 3/04* | (2006.01) |
| *C21D 9/00* | (2006.01) |
| *C21D 1/74* | (2006.01) |

(52) U.S. Cl.
CPC ............. *G11B 23/00* (2013.01); *C21D 9/0068* (2013.01); *C23F 3/04* (2013.01); *C21D 1/74* (2013.01)

(58) Field of Classification Search
CPC ......... C23F 3/04; C21D 9/0068; C21D 1/74; G11B 23/00
See application file for complete search history.

(56) References Cited

U.S. PATENT DOCUMENTS

| | | | |
|---|---|---|---|
| 2002/0117023 A1 | 8/2002 | Nagata et al. | |
| 2007/0082223 A1* | 4/2007 | Izumida et al. | ............. 428/679 |
| 2010/0284111 A1* | 11/2010 | Yabu et al. | .................. 360/244 |

FOREIGN PATENT DOCUMENTS

| | | |
|---|---|---|
| JP | 3-180500 | 8/1991 |
| JP | 3563037 | 6/2004 |

* cited by examiner

*Primary Examiner* — Rebecca Lee
(74) *Attorney, Agent, or Firm* — Norris McLaughlin & Marcus, P.A.

(57) ABSTRACT

Provided is a method for surface-treating a metal component, whereby a pseudo-plated layer can be formed on a surface of a metal component, and quality equivalent to plating or other coating process can be obtained. The method includes a chemical polishing step scraping a surface of a base plate formed into a given shape through chemical polishing by 0.5 micrometer or more, and a heat treat pseudo-plating step forming a pseudo-plated layer on the surface through a heat treatment conducted by heating the base plate at a solution treatment temperature or above, for example, 850 degrees C. or above, preferably approximate 1040 degrees C., in a reducing atmosphere after the polishing step.

17 Claims, 5 Drawing Sheets

METHOD OF SURFACE-TREATING METAL COMPONENT

TECHNICAL FIELD

The present invention relates to a method of surface-treating a metal component used for, for example, a disk drive of a personal computer.

BACKGROUND OF THE INVENTION

Generally, fine metal burrs or cracks remain on fracture faces in a manufacturing process for a metal component, and a removing process for these burrs or cracks is carried out by barrel polishing.

However, in this process, barrel media (ceramic in general) are stuck into a material surface and left thereon as they are.

Further, in a product with a simple shape, cracks or fracture faces are smoothed on some level through the barrel polishing. However, in a product with a complicated shape, it is impossible to appropriately hit an entire surface with barrel media. This causes unevenness in polishing so that cracks or incompletely-polished fracture faces may remain.

If a product in such a condition is used for an actual product, remaining barrel media or materials themselves drop at the time of assembly of components including the product or after assembly of the finished product, to exert a functional influence on the peripheral devices.

To prevent such dropping, an electroless nickel phosphorus plating process or other coating process is carried out to completely coat a surface of a product. It has a profound effect.

However, the electroless nickel phosphorus plating process or other coating process has an advantage in quality whereas it invariably involves a disadvantage of high cost.

Further, a product may need to be welded, and the product to which the electroless nickel phosphorus plating process or other coating process is carried out causes insufficient welding strength. This involves a problem that a process for welding and coating cannot be realized.

On the other hand, there is a method of manufacturing an iron-based component, which heat-treats a component in a reducing atmosphere after barrel polishing to reduce oxides remaining on a surface and leave iron thereon and keeps diffusion temperature to diffuse iron and flakes of a base material into the base material, thereby to reduce the number of particles remaining on the surface.

However, the barrel polishing leaves irregularities or scratches at the micro level on the surface, and there is a limit on a smoothness of fracture faces at a punched portion. The subsequent heat treatment cannot form a pseudo-plated layer, so that it cannot obtain quality equivalent to the plating or other coating process.

This involves a problem that contaminants (inclusions) spattering from the outside are likely to adhere to even the surface processed by the heat treatment after the barrel polishing.

PATENT DOCUMENT 1: JP Patent No. 3563037

SUMMARY OF THE INVENTION

A problem to be solved by the invention is that an electroless nickel phosphorus plating process or other coating process has an advantage in quality whereas it invariably involves a disadvantage of high cost, and a heat treatment after barrel polishing cannot form a pseudo-plated layer and cannot obtain quality equivalent to that of plating or other coating process.

The present invention provides a method of surface-treating a metal component, capable of forming a pseudo-plated layer on a surface of the metal component and obtaining quality equivalent to plating or other coating process. The method comprises a polishing step polishing a surface of a metal component formed into a given shape by chemical polishing or electrolytic polishing, and a heat treat pseudo-plating step forming a pseudo-plated layer on the surface through a heat treatment conducted by heating the metal component at a solution treatment temperature or above in a reducing atmosphere after the polishing step.

The method of surface-treating a metal component, due to the above-identified composition, forms the pseudo-plated layer on the surface of the metal component and obtain quality equivalent to an electroless nickel phosphorus plating process or other coating process. The method allows the quality equivalent to an electroless nickel phosphorus plating process or other coating process to be obtained at low cost. With the quality equivalent to an electroless nickel phosphorus plating process or other coating process, it suppresses adhesion of contaminants (inclusions) spattering from the outside.

EMBODIMENT FOR CARRYING OUT THE INVENTION

The present invention realizes a method capable of forming a pseudo-plated layer on a surface of a metal component and obtaining quality equivalent to plating or other coating process by a heat treat pseudo-plating step after chemical polishing.

Embodiment 1

Figure 1:
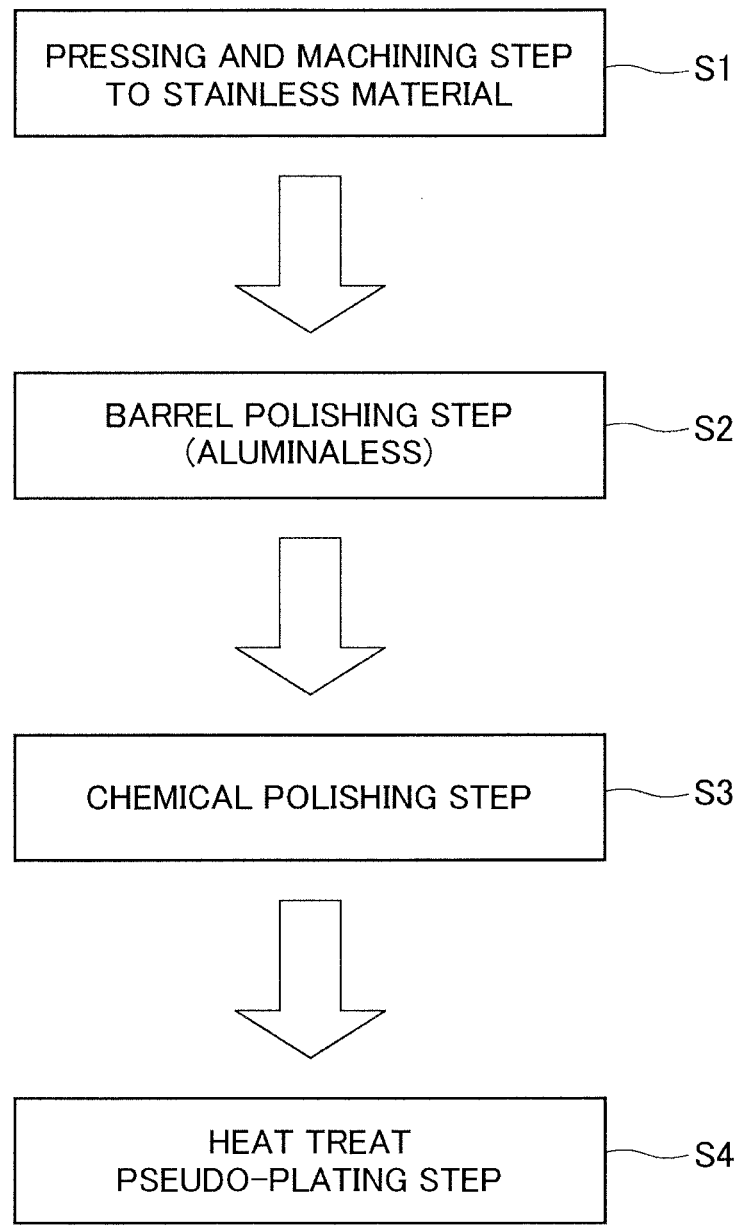
FIG. 1 is a flowchart illustrating a method of surface-treating a metal component according to Embodiment 1.

FIG. 1 is a flowchart illustrating a method of surface-treating a metal component.

As illustrated in FIG. 1, the method of surface-treating a metal component according to the embodiment 1 of the present invention includes a pressing and machining step S1 to a stainless material, a barrel polishing step S2 as a preprocessing step, a chemical polishing step S3 as a polishing step, and a heat treat pseudo-plating step S4. The barrel polishing step S2, however, may be omitted.

The pressing and machining step S1 to the stainless material presses the stainless material into a stainless steel component to be used for a disk drive as a metal component. The stainless steel component, for example, is a stainless steel base plate to be used for a head suspension of a hard disk drive. This step may include other machining.

The base plate is made of a stainless steel (Fe—Cr—Ni based) having a thickness of, for example, approximate 200 micrometer. The base plate is laid on a base portion of a load beam and fixed thereto by laser welding. The base plate has a boss portion formed through the press working to have a short cylindrical shape. The boss portion is a portion to be inserted into an attaching hole of an actuator arm and fixed thereto by ball crimping.

The barrel polishing step S2 uses a barrel polisher and conducts barrel polishing as a preprocessing. In the barrel polishing step S2, granular abrasives (barrel media) made of iron, plastic, or plastic including stainless steel powder are used.

Although the abrasive may have any shape, the abrasive shaped into, for example, polyhedron or burette is used.

The barrel polisher has a polishing tank with a cylindrical shape. Into the inside of the polishing tank, a plurality of base plates as objects to be polished are fed and the abrasives are accommodated as well as water and an additive agent as necessary. Then, the polishing tank is rotated by a motor.

Due to the rotation, the base plates are polished with the abrasives so that irregularities on the surface and burrs on the fracture faces are removed.

In the polished base plates, fine flakes of the abrasives or the base material may be adhered to or stuck into the surface. Accordingly, the next chemical polishing step S3 treats these flakes.

The chemical polishing step S3 conducts a polishing process to the surface by a chemical reaction of an acid chemical (chemical) with the metal component. In this process, the surface of each base plate being the metal component formed into a given shape is scraped by 0.5 micrometer or more through the chemical polishing. With this scraping, the stuck of the abrasives and the like left at the barrel polishing step S2 are removed.

Namely, it evens fine irregularities that are left on the surface and are hard to be removed by the barrel polishing, and removes, through the chemical polishing, the fine burrs on the fracture faces and contaminants (inclusions) generated at the time of the press working and caught on the fracture faces.

With this removal, the surface of the base plate is reformed into a condition at a high cleaning level. Further, faces such as fracture faces including many irregularities can be smoothed to remarkably reduce the number of adhered contaminants during processing.

The heat treat pseudo-plating step S4 forms a pseudo-plated layer on the surface by heating the base plates in a reducing atmosphere.

A hydrogen atmosphere is used as the reducing atmosphere for example, the heat treatment is carried out at a solution treatment temperature or above, for example, 850 degrees C. or above in order to avoid sensitization, preferably approximate 1040 degrees C. Thereafter, cooling is carried out. The condition of the heat treatment is set according to a metal component as an object. In addition, the heat treatment is carried out in relation to temperature and time, so that the processing time may be shortened at a higher temperature or the temperature may be lowered in a longer processing time.

With such a heat treatment after the chemical polishing, oxides on the surface are reduced and the surface of each base plate is promoted to be smoothed due to the diffusion phenomenon. The very small amount of remaining contaminants that are not removed through the chemical polishing are enclosed in the base material, and contaminants do not slide down the component after the heat treatment, thereby to drastically reduce contaminants.

Additionally, with the pseudo-plated layer, it can obtain the surface equivalent to that of an electroless nickel phosphorus plating process or other coating process.

Although the chemical polishing step S83 decreases a density of the surface in a direction of an oxygen depth, the surface density configuration at the chemical polishing step S3 is cancelled by the heat treatment in the heat treat pseudo-plating step S4 after the chemical polishing step S3 and it becomes the same configuration as the original stainless steel.

Figure 2:
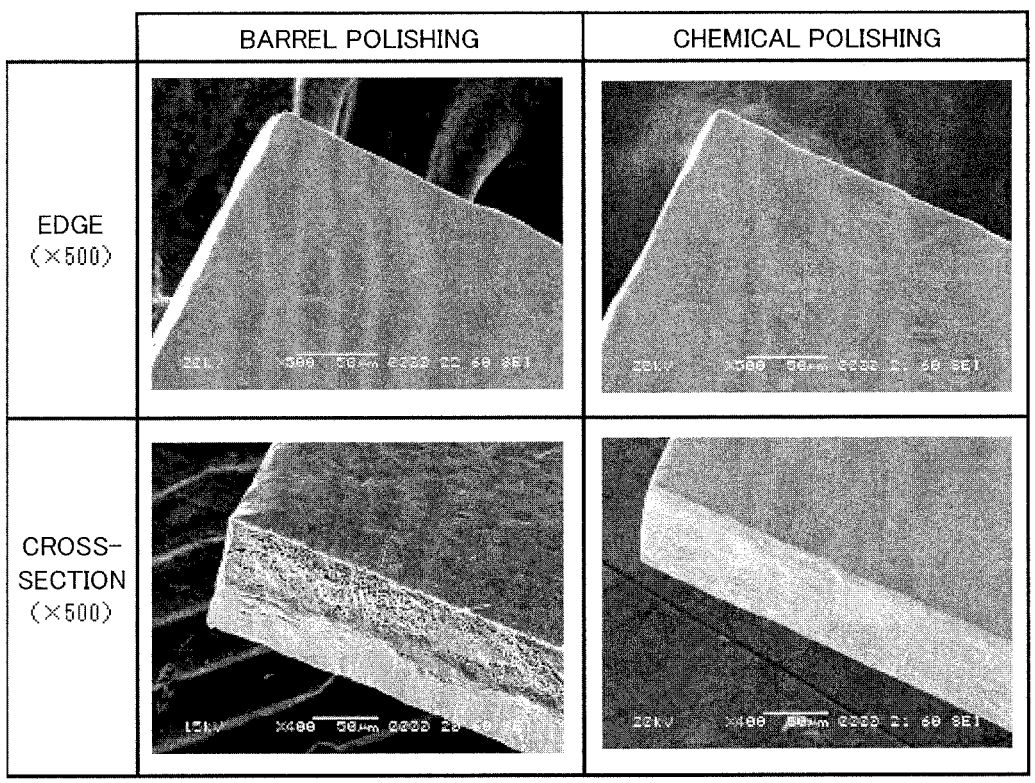
FIG. 2 shows photographs for a comparison between barrel polishing and chemical polishing.

FIG. 2 shows photographs for a comparison between barrel polishing and chemical polishing.

The barrel polishing step S2 leaves irregularities on the surface and fines burrs on the fracture faces as illustrated in the left column of FIG. 2.

The chemical polishing step S3 removes the irregularities or scratches at the micro level on the surface as illustrated in the right column of FIG. 2, to increase the smoothness of the fracture faces at the punched portion.

Figure 3:
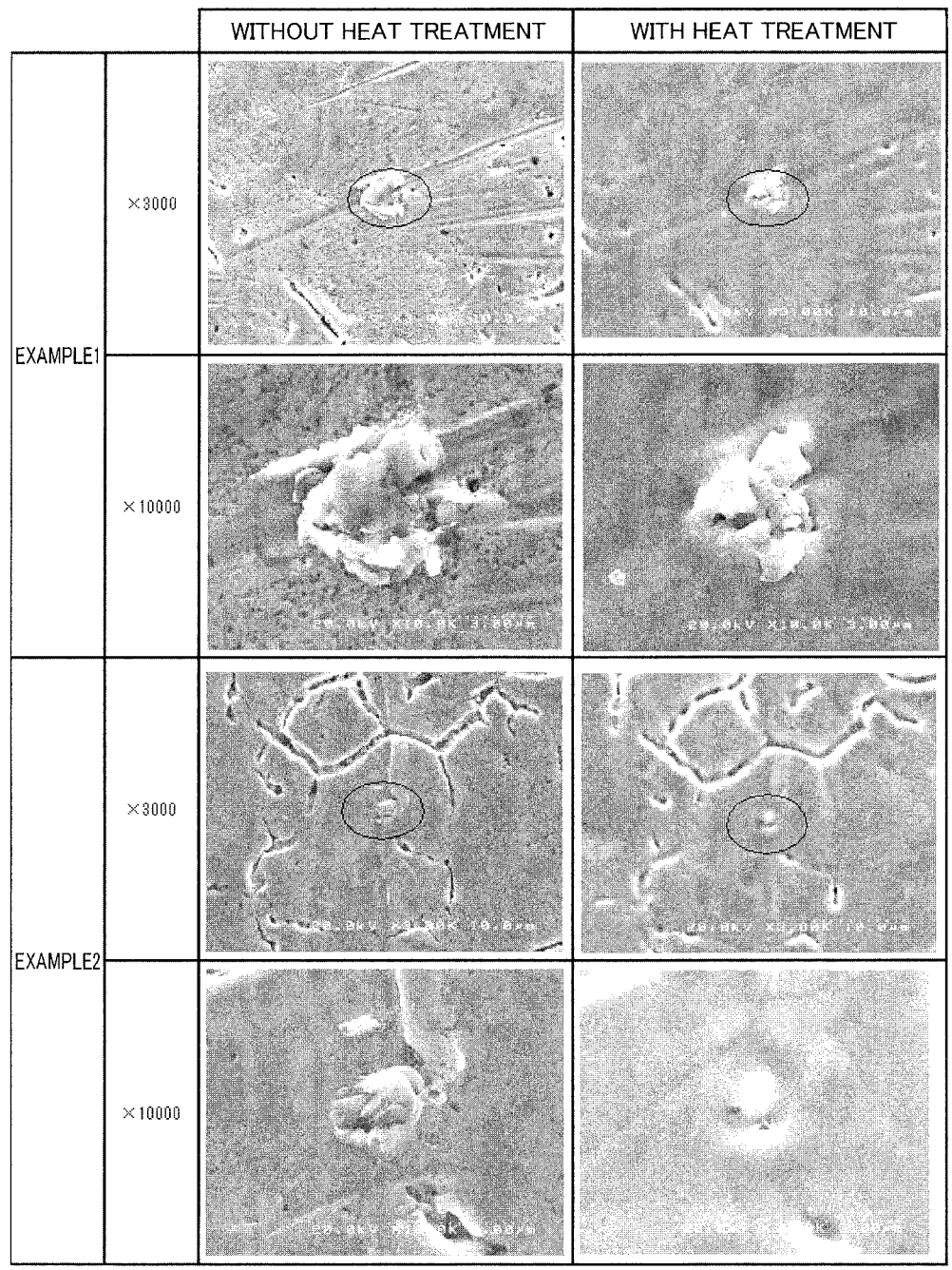
FIG. 3 shows photographs for a comparison between results with and without a heat treatment.

FIG. 3 shows photographs for a comparison between results with and without a heat treatment.

The heat treat pseudo-plating step S4 reduces oxides on the surface by the heat treatment in the reducing atmosphere compared with a case (left column) where a heat treatment is not carried out after the chemical polishing. Further, the surface is promoted to be smoothed due to the diffusion phenomenon (right column).

Figure 4:
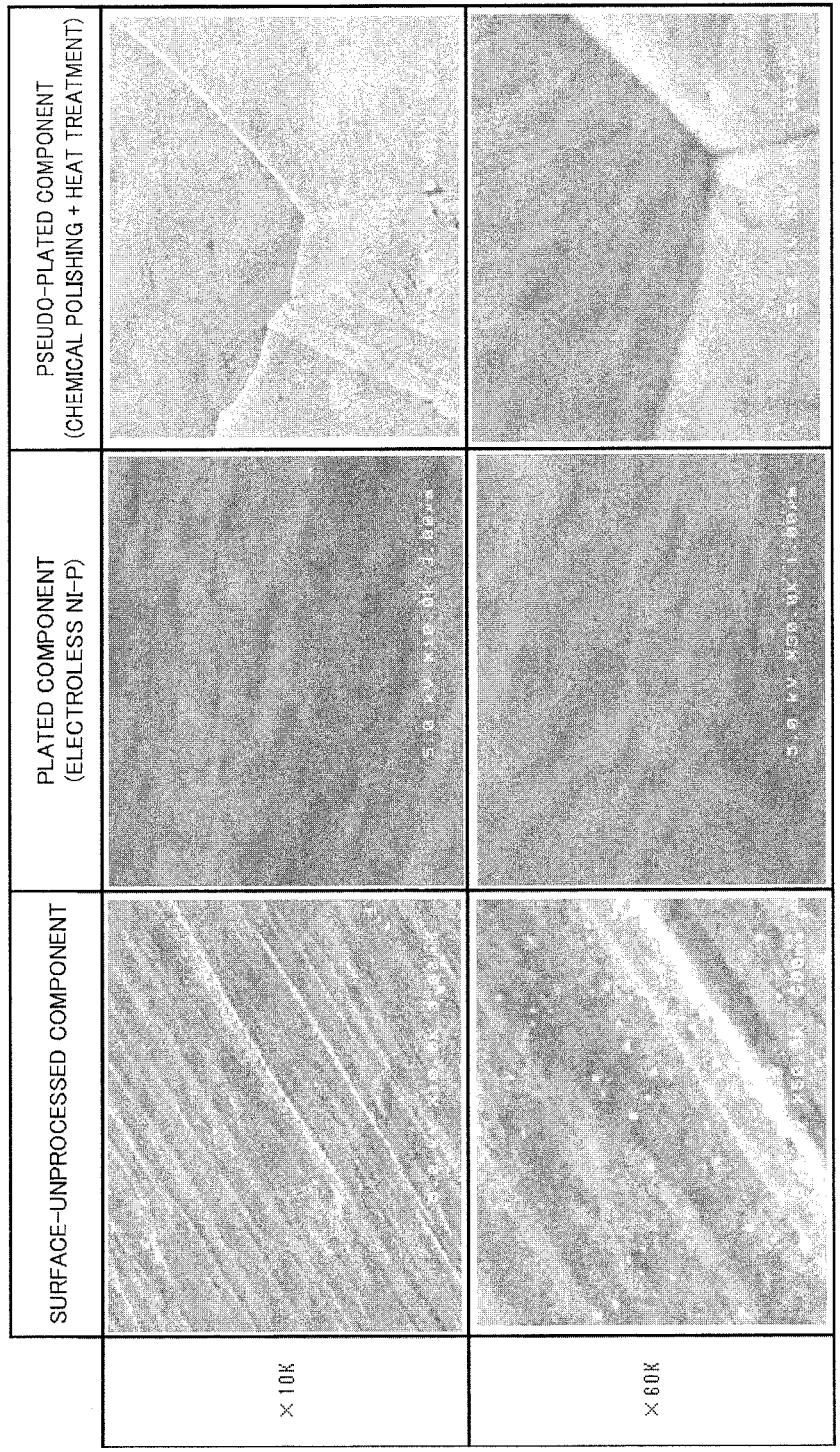
FIG. 4 shows photographs for a comparison among results without a surface treatment, with a plating process, and with a pseudo-plating process.

FIG. 4 shows photographs for a comparison among a surface-untreated component, a plated component, and a pseudo-plated component. As the surface-untreated component, it shows a surface of a pressed stainless material. As the plated component, it shows a surface of an electroless nickel phosphorus plate. As the pseudo-plated component, it shows a surface that is heat-treated after the chemical polishing.

The surface-untreated component has the remarkably rough surface and has fine dusts.

On the other hand, the plated component and pseudo-plated component have the respective surfaces that are greatly smoother than that of the surface-untreated component. The pseudo-plated component has the smoothness equivalent to the plated component and has no dusts.

Figure 5:
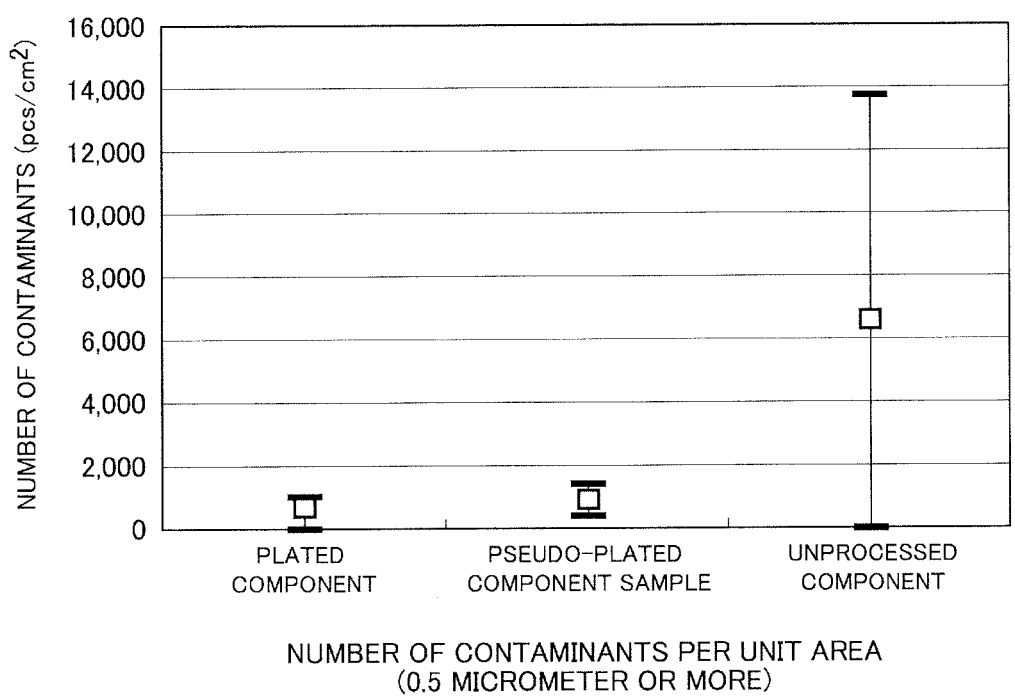
FIG. 5 is a graph illustrating the number of contaminates of a plated component, a pseudo-plated component, and an unprocessed component by comparison.

FIG. 5 is a graph illustrating the number of contaminates of a plated component, a pseudo-plated component, and an unprocessed component by comparison.

As illustrated in FIG. 5, the number of contaminants of the pseudo-plated component is equivalent to that of the plated component and is much less than that of the unprocessed component.

The method of surface-treating a metal component according to the embodiment 1 of the present invention includes the chemical polishing step S3 scraping the surface of the stainless steel base plate formed into a given shape through the chemical polishing by 0.5 micrometer or more, and the heat treat pseudo-plating step forming the pseudo-plated layer on the surface through the heat treatment conducted by heating the base plate at the solution treatment temperature or above, for example, 850 degrees C. or above, preferably approximate 1040 degrees C., in the reducing atmosphere after the chemical polishing step S3.

Accordingly, the oxides on the surface are reduced and the surface of the base plate is promoted to be smoothed due to the diffusion phenomenon. The very small amount of remaining contaminants that are not removed through the chemical polishing are enclosed in the base material, thereby to drastically reduce contaminants.

Further, with the pseudo-plated layer, it can obtain the surface equivalent to that of an electroless nickel phosphorus plating process or other coating process.

Therefore, contaminants (inclusions) spattering from the outside are hard to adhere to the base plate after the surface treatment, and it surely prevents contaminants from dropping off onto a hard disk or the like when assembling the base plate or after incorporating a head suspension into a hard disk drive.

The method allows the quality equivalent to that of an electroless nickel phosphorus plating process or other coating process to be obtained at low cost.

With the quality equivalent to that of an electroless nickel phosphorus plating process or other coating process, it surely suppresses adhesion of contaminants (inclusions) spattering from the outside to the base plate.

In contrast to an electroless nickel phosphorus plating process or other coating process, the pseudo-plated layer allows welding strength to be sufficient.

The method includes the barrel polishing step S2 preprocessing the base plate by the barrel polishing before the chemical polishing step S3.

Accordingly, the irregularities on the surface and the burrs on the cut faces are removed (left column of FIG. 2), to improve the accuracy of the chemical polishing at the chemical polishing step S3 and surely form the pseudo-plated layer through the subsequent heat treatment.

In the aforementioned embodiment, the metal component is the base plate of the head suspension. The method is applicable to the other metal component that requires the quality equivalent to that of a plating process or other coating process.

The polishing step only has to allow the pseudo-plated layer to be formed through the subsequent heat treatment, and therefore, electrolytic polishing may be used instead of the chemical polishing depending on metal components.

The chemical polishing only has to allow the pseudo-plated layer to be formed through the subsequent heat treatment, and therefore, the amount of the scraping is not limited to 0.5 micrometer or more and may be increased or decreased.

The invention claimed is:

1. A method of surface-treating a Fe—Cr—Ni stainless steel component, comprising:
   a polishing step polishing a surface of the Fe—Cr—Ni stainless steel component formed into a given shape by chemical polishing; and
   a heat treat pseudo-plating step forming a pseudo-plated layer on the surface through a heat treatment conducted by heating the Fe—Cr—Ni stainless steel component having the surface being in a chemically-polished state at a solution treatment temperature or above in a reducing atmosphere after the polishing step.

2. The method of claim 1, wherein the polishing step scrapes the surface of the Fe—Cr—Ni stainless steel component by 0.5 micrometer or more.

3. The method of claim 1, wherein the heat treat pseudo-plating step forms the pseudo-plated layer through a solution treatment conducted by heating at 850 degrees C. or above in the reducing atmosphere.

4. The method of claim 1, further comprising:
   a preprocessing step preprocessing the Fe—Cr—Ni stainless steel component by barrel polishing before the polishing step.

5. The method of claim 1, wherein the Fe—Cr—Ni stainless steel component is a component of a disk drive.

6. The method of claim 2, wherein the heat treat pseudo-plating step forms the pseudo-plated layer through a solution treatment conducted by heating at 850 degrees C. or above in the reducing atmosphere.

7. The method of claim 2, further comprising:
   a preprocessing step preprocessing the Fe—Cr—Ni stainless steel component by barrel polishing before the polishing step.

8. The method of claim 3, further comprising:
   a preprocessing step preprocessing the Fe—Cr—Ni stainless steel component by barrel polishing before the polishing step.

9. The method of claim 6, further comprising:
   a preprocessing step preprocessing the Fe—Cr—Ni stainless steel component by barrel polishing before the polishing step.

10. The method of claim 2, wherein the Fe—Cr—Ni stainless steel component is a component of a disk drive.

11. The method of claim 3, wherein the Fe—Cr—Ni stainless steel component is a component of a disk drive.

12. The method of claim 4, wherein the Fe—Cr—Ni stainless steel component is a component of a disk drive.

13. The method of claim 6, wherein the Fe—Cr—Ni stainless steel component is a component of a disk drive.

14. The method of claim 7, wherein the Fe—Cr—Ni stainless steel component is a component of a disk drive.

15. The method of claim 8, wherein the Fe—Cr—Ni stainless steel component is a component of a disk drive.

16. The method of claim 9, wherein the Fe—Cr—Ni stainless steel component is a component of a disk drive.

17. A method of surface-treating a Fe—Cr—Ni stainless steel component, comprising:
   a preprocessing step preprocessing a surface of the Fe—Cr—Ni stainless steel component formed into a given shape by barrel polishing;
   a polishing step, after the preprocessing step, polishing the surface of the Fe—Cr—Ni stainless steel component by chemical polishing, to remove fine irregularities that are left on the surface and are hard to be removed by the barrel polishing; and
   a heat treat pseudo-plating step forming a pseudo-plated layer on the surface through a heat treatment conducted by heating the Fe—Cr—Ni stainless steel component at a solution treatment temperature or above in a reducing atmosphere after the polishing step.

* * * * *